United States Patent
Loveland et al.

(10) Patent No.: US 9,814,117 B2
(45) Date of Patent: Nov. 7, 2017

(54) SYSTEMS AND APPARATUS FOR AUTOMATICALLY DERIVING AND MODIFYING PERSONAL PREFERENCES APPLICABLE TO MULTIPLE CONTROLLABLE LIGHTING NETWORKS

(75) Inventors: Damien Loveland, Richmond, CA (US); A. J. W. A Vermuelen, Drachtster Compagnie (NL); Ian Ashdown, West Vancouver (CA); Louis Ketelaars, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1149 days.

(21) Appl. No.: 13/377,359

(22) PCT Filed: May 18, 2010

(86) PCT No.: PCT/IB2010/052211
§ 371 (c)(1),
(2), (4) Date: Mar. 6, 2012

(87) PCT Pub. No.: WO2010/143089
PCT Pub. Date: Dec. 16, 2010

(65) Prior Publication Data
US 2012/0169249 A1    Jul. 5, 2012

Related U.S. Application Data
(60) Provisional application No. 61/185,329, filed on Jun. 9, 2009.

(51) Int. Cl.
H05B 37/02    (2006.01)
(52) U.S. Cl.
CPC ............... H05B 37/0245 (2013.01)

(58) Field of Classification Search
CPC . G03B 15/02; H04L 12/2803; H04L 12/2829; H05B 37/029; H05B 37/0227; H05B 37/0245
(Continued)

(56) References Cited

U.S. PATENT DOCUMENTS 5,945,988 A * 8/1999 Williams ............. G11B 27/105
                                                348/E17.005
6,498,955 B1 * 12/2002 McCarthy et al. ............... 700/1
(Continued)

FOREIGN PATENT DOCUMENTS

JP    2005215789 A    8/2005
JP    2007107871 A    4/2007
(Continued)

*Primary Examiner* — Kenneth M Lo
*Assistant Examiner* — Michael J Huntley
(74) *Attorney, Agent, or Firm* — Meenakshy Chakravorty

(57) ABSTRACT

Systems and methods for deriving and modifying personal preferences related to at least one controllable lighting network are disclosed. The systems include a processor that can be used in conjunction with a personal communication device and a preferences database. The processor is used to detect an identifier for a user, a plurality of adjustments to the at least one controllable lighting network requested by the user, and a context corresponding to each of the plurality of adjustments. The processor in some such systems has an associated local memory to store the plurality of adjustments, corresponding contexts, and the identifier of the associated user. The processor is further used to analyze the plurality of lighting adjustments and the corresponding contexts. Based on the analysis, the processor identifies a correlation between the plurality of adjustments and the contexts, and create at least one personal preference rule associated with the user identifier based on the correlation.

(Continued)

The preferences database in some such systems is used to store the rules and the plurality of adjustments.

22 Claims, 8 Drawing Sheets

(58) Field of Classification Search
USPC .......................................... 700/90; 715/751
See application file for complete search history.

(56) References Cited

U.S. PATENT DOCUMENTS

| | | | |
|---|---|---|---|
| 7,016,888 B2* | 3/2006 | Slemmer | G05B 13/028 |
| | | | 706/47 |
| 7,242,988 B1* | 7/2007 | Hoffberg | G05B 19/0426 |
| | | | 348/E5.102 |
| 2003/0227439 A1* | 12/2003 | Lee | G06K 9/00221 |
| | | | 345/156 |
| 2005/0185398 A1* | 8/2005 | Scannell, Jr. | 362/227 |
| 2006/0053115 A1* | 3/2006 | Ashby | G06F 17/30056 |
| 2006/0170376 A1 | 8/2006 | Piepgras et al. | |
| 2006/0200433 A1* | 9/2006 | Flinn | G06N 99/005 |
| | | | 706/12 |
| 2006/0267566 A1* | 11/2006 | Williams | H05B 37/0218 |
| | | | 323/282 |
| 2008/0155429 A1* | 6/2008 | Frank et al. | 715/751 |
| 2008/0218307 A1* | 9/2008 | Schoettle | 340/3.1 |
| 2009/0065596 A1* | 3/2009 | Seem et al. | 236/51 |
| 2009/0171478 A1* | 7/2009 | Wong | 700/13 |
| 2009/0254425 A1* | 10/2009 | Horowitz | G06F 17/30864 |
| | | | 705/300 |
| 2010/0141153 A1* | 6/2010 | Recker et al. | 315/149 |
| 2010/0171430 A1* | 7/2010 | Seydoux | 315/159 |
| 2010/0301776 A1* | 12/2010 | Feri et al. | 315/312 |
| 2011/0035029 A1* | 2/2011 | Yianni et al. | 700/90 |
| 2012/0057050 A1* | 3/2012 | Ashdown | 348/234 |
| 2013/0268127 A1* | 10/2013 | Casilli et al. | 700/276 |

FOREIGN PATENT DOCUMENTS

| | | | | |
|---|---|---|---|---|
| JP | 2008204849 A | | 9/2008 | |
| JP | 2009026613 A | | 2/2009 | |
| JP | 2011118689 A | | 6/2011 | |
| NL | WO 2007119126 A2 * | 10/2007 | ............. | H05B 37/02 |
| WO | 03058575 A1 | | 7/2003 | |
| WO | 2007072291 A2 | | 6/2007 | |
| WO | 2008068728 A1 | | 6/2008 | |

\* cited by examiner

SYSTEMS AND APPARATUS FOR AUTOMATICALLY DERIVING AND MODIFYING PERSONAL PREFERENCES APPLICABLE TO MULTIPLE CONTROLLABLE LIGHTING NETWORKS

TECHNICAL FIELD

The present invention is directed generally to controllable networks and related communications. More particularly, the present invention is directed to systems and apparatus for deriving, modifying, and sharing personal preferences applicable to controllable lighting networks.

BACKGROUND

Digital lighting technologies, i.e. illumination based on semiconductor light sources, such as light-emitting diodes (LEDs), today offer a viable alternative to traditional fluorescent, HID, and incandescent lamps. Recent advances in LED technology coupled with its many functional advantages such as high energy conversion and optical efficiency, durability, and lower operating costs, has led to the development of efficient and robust full-spectrum lighting sources that enable a variety of lighting effects. For example, fixtures embodying these lighting sources may include one or more LEDs capable of producing different colors, e.g. red, green, and blue, as well as a processor for independently controlling the output of the LEDs in order to generate a variety of colors and color-changing lighting effects, as discussed in U.S. Pat. Nos. 6,016,038 and 6,211,626.

Controllable lighting networks and systems include lighting management systems that are capable of utilizing digital lighting technologies in order to control the lighting in one or more spaces. Controllable lighting networks and systems may control luminaires in a space based on the personal lighting preferences of individuals detected within or otherwise associated with a space. Many controllable lighting networks and systems utilize sensor systems to receive information about the spaces under their influence. Such information may include the identities of individuals detected within such spaces as well as the personal lighting preferences associated with such individuals. Consequently, controllable lighting systems used today permit users to control the lighting by applying personal preferences. Recent research studies conducted indicate that personal control of lighting can result in significant improvement in employee satisfaction, motivation and well-being. This causal link between personal control and performance validates the impact that quality lighting, where quality is measured based on satisfaction of personal preferences, can have on how people perform in the workplace.

From a user's perspective, many conventional systems and techniques for implementing lighting control often offer little more than lamp dimming according to previously entered preferences. For example, in many known systems, a user's lighting preferences for a specific environment can be programmed by a building administrator. The system can then control the environment's lights to implement the user's preferred lighting arrangement. In this manner, an office worker who prefers to have his or her workspace brightly lit, or alternatively dimly lit, can have the system programmed accordingly by an administrator. Similarly, administrators can schedule "on" and "off" time periods according to a user's work schedule to save energy.

Other known systems feature direct-indirect fluorescent luminaires with integrated occupancy and daylight sensors that communicate with a central controller via an RS-485 hardwired network. The central controller then communicates via a local area network (LAN) with desktop computers. This system enables office workers to dim task (direct) and ambient (indirect) lighting over their workstations and turn task and ambient lighting on and off using personal lighting control software installed on their computers. The system also permits office managers to: assign control to individual luminaires, groups, areas, and the entire lighting network; enable and disable luminaire daylight sensors; enable and disable luminaire occupancy sensors; specify occupancy sensor delay times; independently specify task and ambient lamp control; enable and disable load shedding; generate detailed energy consumption reports; and schedule daily, weekly, monthly, and annual events. In this sense, this system and similar conventional products may be considered as extensions of building management systems that also manage HVAC and security subsystems.

Lighting systems also have been disclosed in which a user can input his or her lighting preferences for a specific location, and a central controller can execute a lighting script to instruct LEDs or other light sources and implement the person's preferences. In one conventional approach, lighting systems may receive inputs indicating the presence of a person, the duration of the person's presence, or identifying the presence of a particular person or persons present in the location by, for example, the magnetic reading of name badges or a biometric evaluation. Different lighting scripts may then be implemented depending upon whether a person is present, how long the person is present, and which person is present. These systems may also select different lighting scripts depending on the number of persons in a room or the direction the people are facing. For example, lighting devices and other energy sources can be turned on or off depending on information in a person's electronic calendar.

Some conventional lighting systems can receive information regarding a person's presence or the person's preferences from a device carried by a user. For example, in some disclosed systems, a card reader can detect the presence of a card carried by a user, which can then cause the system to turn a light on when, for example, the user enters a room and turn off the light when the user exits the room. In other disclosed lighting systems, a user stores his or her preferences on a mobile device or card. As the user travels, data can be transferred to devices and systems capable of conforming parameters under their control to the stored preferences (e.g., dim lights or change their color), either through automatic detection of the card or, in other systems, by inserting the card into a card reader.

While advances in digital lighting technologies have given rise to precisely controllable lighting, the known systems for implementing user preferences require the repetitive task of setting the lighting in a networked or non-networked system. While users may be willing to manually enter a small number of preferences in one lighting system, there are so many variables that may be adjusted with today's solid state lighting and electronic devices that the lighting system may not be fully leveraged.

Although the fields of mobile devices and digital or solid-state lighting have seen great advances, systems that combine the use of controllable solid state lighting and personal mobile devices to further enrich deriving personal lighting preferences and adjusting lighting based on personal preferences across a plurality of lighting networks are lacking. For example, in systems implementing user preferences, a user's preferences generally (1) need to be initially manually entered for every single variable that may be adjusted and (2) are specific to a particular location and not executable in a different location or in different networks.

SUMMARY

Applicants herein generally recognized that there is a need in the art to combine advances made in controllable lighting technology with advances made in communications technology, because conventional solutions in the fields of lighting control and the electronic communications do not fully leverage advantages provided by the advances in both fields, choosing instead to focus on one at the exclusion of the other. Applicants, however, appreciated that a combination of controllable lighting and electronic communications technologies has the capacity to provide particularly advantageous solutions in a multitude of circumstances where either technology operating alone is not fully leveraged.

Applicants specifically recognized a need in the art for systems, methods, and apparatus for deriving and implementing personal preferences for controllable lighting without requiring that the user take the time to identify and enter all of his own preferences and that learning systems alone may not overcome all of the deficiencies associated with controllable lighting networks operating in isolation. In particular, no system currently known to the Applicants permits a user to record the manual settings, create preference rules, and then share these preference rules with other controllable lighting networks. Applicants recognized that if such learning systems were permitted to share information related to controllable lighting networks, then personal preferences can be deduced more quickly and future manual adjustments could be reduced or eliminated. Thus, there is an unfulfilled need in the art for systems, methods, and apparatus for sharing such user preferences related to controllable lighting networks. Accordingly, the present disclosure is directed at systems and apparatus for deriving and modifying personal preferences related to controllable lighting networks and for using communications technology to leverage the personal preferences.

Systems and processes in accordance with various embodiments and implementations of the present invention may offer one or more advantages to users. First, unlike conventional lighting control networks, various exemplary systems contemplated herein may enable a user to communicate personal preferences regarding lighting and possibly other controllable devices via a user interface that may interact with the user's personal mobile device. Additionally or alternatively, such exemplary system may derive personal preferences from adjustments to multiple controllable lighting networks requested by the user, and/or store such personal preferences as rules in a preferences database.

Also, some of the exemplary systems may enable a user to display recently saved personal preferences in lighting settings in a social environment. Additionally, these exemplary systems, by enabling users to display personal lighting preferences, may make it possible for users to take into account other individuals' personal lighting preferences. For example, preferences can be enhanced to accommodate opinions of other people, via explicit or implicit voting or via adjustments made. Networks can express preferences in full or in part depending on the local context, network configuration, network capability, and other users' preferences. Moreover, the exemplary system makes it possible for users to weigh the influence of others' personal lighting preferences based on certain information, such as personal music favorites.

Generally, one aspect of the invention is a system for deriving personal preferences related to at least one controllable lighting network. The system includes at least one processor and a memory. The at least one processor is configured to execute an awareness module and an inference engine. The awareness module detects an identifier for a user, a plurality of adjustments to the at least one controllable lighting network requested by the user, and a context corresponding to each of the plurality of adjustments. The inference engine analyzes the plurality of adjustments and the corresponding contexts to identify a correlation between the plurality of adjustments and the contexts, and creates at least one personal preference rule associated with the identifier of the associated user based on the identified correlation. The memory is configured to store the plurality of adjustments and the corresponding contexts, and the identifier of the associated user.

In some embodiments of the foregoing aspect of the invention, the processor is also configured to execute an executive module that generates a control signal directed to the at least one controllable lighting network based on the plurality of adjustments to the at least one controllable lighting network and/or based on the at least one personal preference rule. In some embodiments of the invention, the system also includes a preferences database configured to store the at least one personal preference rule, the plurality of adjustments, the corresponding contexts, and the identifier of the associated user. In some such embodiments, the personal preference rule includes a likelihood value.

Another aspect of the invention is a system for applying personal preferences related to at least one controllable lighting network. The system includes at least one processor configured to execute an awareness module and an executive module. The awareness module detects an identifier for a user and a user context. The executive module requests from a preferences database a personal preference rule associated with the identifier of the user and based on a correlation between a plurality of adjustments to at least one controllable lighting network requested by the user and the corresponding user contexts, and generates a control signal directed to the at least one controllable lighting network based on the personal preference rule.

Another aspect of the invention is a system for modifying personal preferences related to at least one controllable lighting network. The system includes a preferences database and at least one processor. The preferences database is configured to store a plurality of personal preference rules and a plurality of sets of data related to the at least one controllable lighting network. The plurality of personal preference rules includes a first personal preference rule associated with a first user identifier and a second personal preference rule associated with a second user identifier. The first personal preference rule is created based on a correlation between a plurality of adjustments to the at least one controllable lighting network requested by a first user and corresponding contexts, and has a first likelihood value. The plurality of adjustments to the at least one controllable lighting network requested by the first user and corresponding contexts are the first set of data. The second personal preference rule is similarly created based on a correlation between a plurality of adjustments to the at least one controllable lighting network requested by a second user and corresponding contexts, and similarly has a second likelihood value. The plurality of adjustments to the at least one controllable lighting network requested by the second user and corresponding contexts are the second set of data. The at least one processor is configured to retrieve the first personal preference rule, the first set of data, and the second set of data from the preferences database; to compare the first and second sets of data, and to adjust the likelihood value of the first personal preference rule based on the comparison.

According to some embodiments of the invention, the first set of data comprises at least one vote indicating a lighting preference of the first user and the second set of data further comprises at least one vote indicating a lighting preference of the second user. In another embodiment of the present invention, the executive module generates a control signal directed to solicit at least one vote indicating a lighting preference.

Generally, one aspect of the invention is a method for deriving personal preferences in a controllable lighting network. The controllable lighting network comprises at least one memory for storing data and instructions, a user interface, a lighting source, at least one processor. The at least one processor carries out the instructions contained in distinct software modules of an awareness module, an executive module, and an inference engine and these distinct software modules are located in the at least one memory. The system 10 is configured to perform the steps of detecting by the awareness module a user identifier and a plurality of adjustments to at least one controllable lighting network requested by a user, identifying by the awareness module a context for each of the plurality of adjustments, analyzing by the inference engine the plurality of adjustments and the contexts for the plurality of adjustments to identify a correlation between the plurality of adjustments and the contexts, creating by the inference engine at least one personal preference rule based on the identified correlation, and storing the at least one personal preference rule in a preferences database with the user identifier, the at least one personal preference rule being associated with the user identifier.

According to some embodiments of the invention, the processor further performs the steps of transmitting by the awareness module to the executive module a signal corresponding to the adjustments, and implementing by the executive module the adjustments in the controllable lighting network based on the signal.

Another aspect of the present invention is a method for adjusting lighting based on personal preferences across a plurality of controllable lighting networks with at least one memory for storing data and instructions, a user interface, a lighting source, at least one processor executing the instructions from an awareness module, an executive module, and an inference engine, that are located in the at least one memory. The method includes the computer-implemented steps of detecting a user identifier by the awareness module, retrieving a personal preference rule associated with the user identifier from a preferences database by the executive module, the personal preference rule created based on a correlation between a plurality of adjustments requested by the user across the plurality of controllable lighting networks, and contexts for the plurality of adjustments, and adjusting the lighting source based on the personal preference rule.

According to another aspect of the present invention, a method for modifying a personal preference in a controllable lighting network is identifying a personal preference rule and a first set of criteria for a first user, the personal preference rule having a likelihood value and created based on a correlation between a plurality of adjustments to the controllable lighting network requested by user, and contexts for the plurality of adjustments, identifying a second set of criteria for at least one second user, comparing the first set of criteria with the second set of criteria, adjusting the likelihood value of the personal preference rule based on the comparison and storing the personal preference rule in a preferences database with the user identifier. The controllable lighting network comprises at least one memory for storing data and instructions, a user interface, a lighting source, at least one processor having distinct software modules such as an awareness module, an executive module, and an inference engine. The distinct software modules are configured to access the at least one memory.

Moreover, many aspects of the present invention involve modifying a personal preference in a controllable lighting network based on votes from users of a controllable lighting network comprising at least one memory for storing data and instructions, a user interface, a lighting source, at least one processor configured to execute the instructions from distinct software modules. The distinct software modules include an awareness module, an executive module, and an inference engine and are located in the at least one memory. The distinct software modules are configured to identify a personal preference rule and a first set of criteria for a first user, the personal preference rule created based on a correlation between a plurality of adjustments to the controllable lighting network requested by the user, and contexts for the plurality of adjustments. The modules are further configured to identify a second set of criteria for a second user, compare the first set of criteria with the second set of criteria, receive a vote from the second user based on the comparison, and adjust the personal preference rule of the first user based on the vote from the second user, the at least one vote determined based on the comparison.

Another aspect of the present invention involves modifying a personal preference in a controllable lighting network based on a user's adjustment history. The controllable lighting network consists of at least one memory for storing data and instructions, a user interface, a lighting source, at least one processor configured to execute the instructions from distinct software modules. The distinct software modules include an awareness module, an executive module, and an inference engine and are located in the at least one memory. The modules are configured to identify a first set of criteria for a first user. The modules are further configured to identify a second set of criteria for the second user and a personal preference rule created based on a correlation between a plurality of adjustments to the controllable lighting network requested by the second user, and contexts for the plurality of adjustments. The modules are further configured to compare the first set of criteria with the second set of criteria, identify previous adjustments by the first user to the personal preference rule of the second user based on the comparison and adjust the personal preference rule of the second user based on the previous adjustments.

It should be appreciated that the foregoing concepts, alone and in various combinations (provided the combinations are not mutually inconsistent), as discussed in greater detail below are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

DETAILED DESCRIPTION

Reference is now made in detail to illustrative embodiments of the invention, examples of which are shown in the accompanying drawings.

Figure 1:
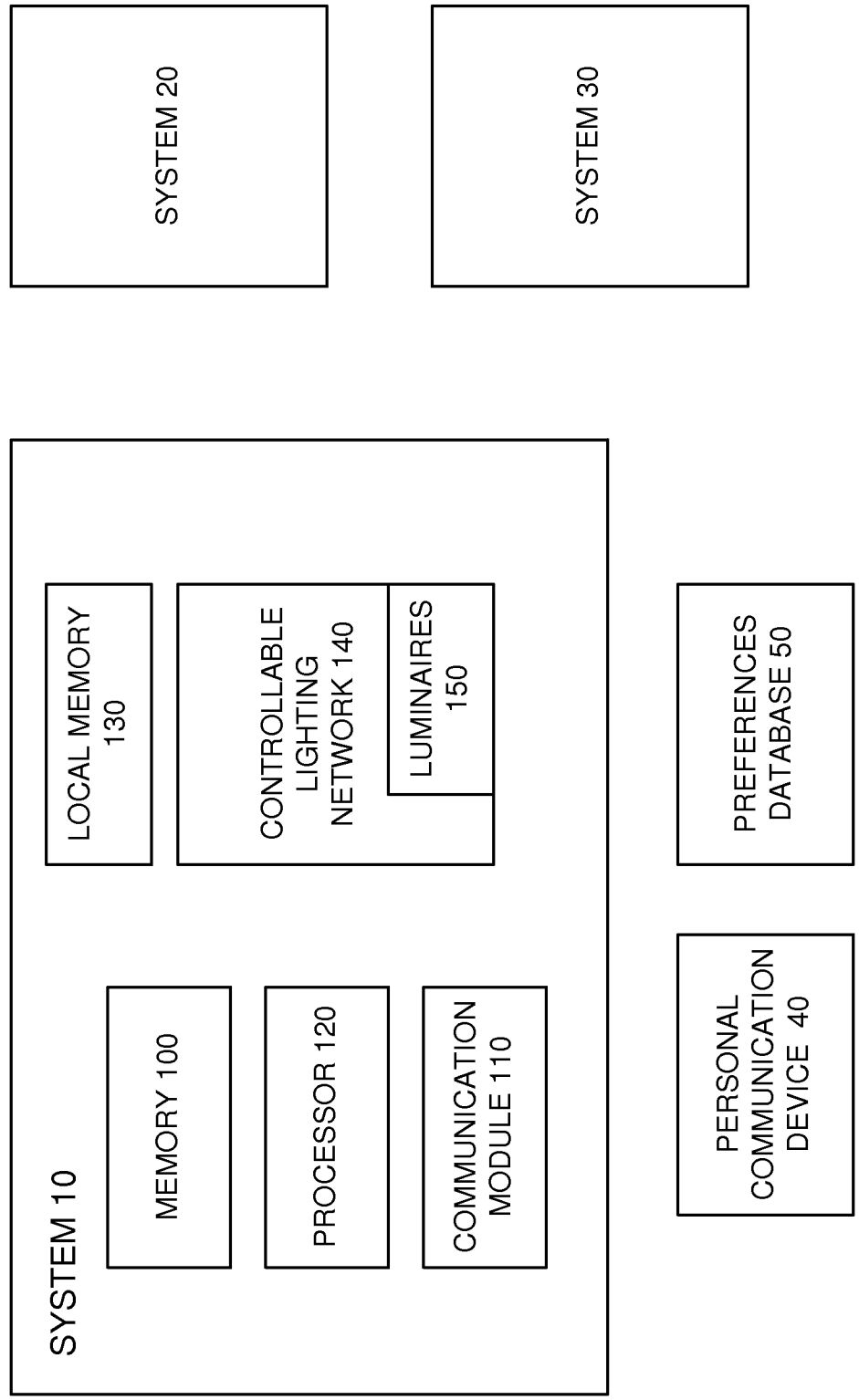
FIG. 1 illustrates a plurality of controllable lighting networks with respect to each of which personal preferences may be derived and/or applied according to some embodiments of the invention.

FIG. 1 illustrates an interactive system 10 with respect to which the present invention is useful. Interactive system 10 includes a memory 100, a communication module 110, a processor 120, a local memory 130, and a controllable lighting network 140 including one or more individually controllable luminaires 150. A personal communication device (personal device) 40 can move in and out of, and interact with, interactive system 10. Any number of distinct personal devices, such as personal device 40, can be within interactive system 10, at any one time. Luminaires 150 in the controllable lighting network 140 can be manually adjusted through system 10. System 10 may store on local memory 130 any adjustments requested by a user. System 10 may further store on local memory 130 any preferences related to system 10 entered by the user. In interactive system 10, communication module 110 is used by processor 120 to communicate with personal device 40. Communication module 110 transmits a user identifier derived from personal device 40 to processor 120. In response to the user identifier, system 10 accesses information about the user from local memory 130 and may adjust luminaires 150 in the controllable lighting network 140 according to that information.

A preferences database 50 in accordance with the invention can be included within any one of the interactive systems 10, 20, 30 or can be remote from each of them. Preferences database 50 in embodiments of the invention is accessible to each of the interactive systems 10, 20, 30 via communication module 110 or another communications link (not shown). A personal communication device (personal device) 40 can move in and out of, and interact with, any one of the interactive systems 10, 20, 30 and any number of similar systems. Any number of distinct personal devices, such as personal device 40, can be within an interactive system, such as systems 10, 20, 30, at any one time. Although FIG. 1 illustrates three interactive systems, it should be understood that the present invention is useful with respect to any number of interactive systems.

Figure 2:
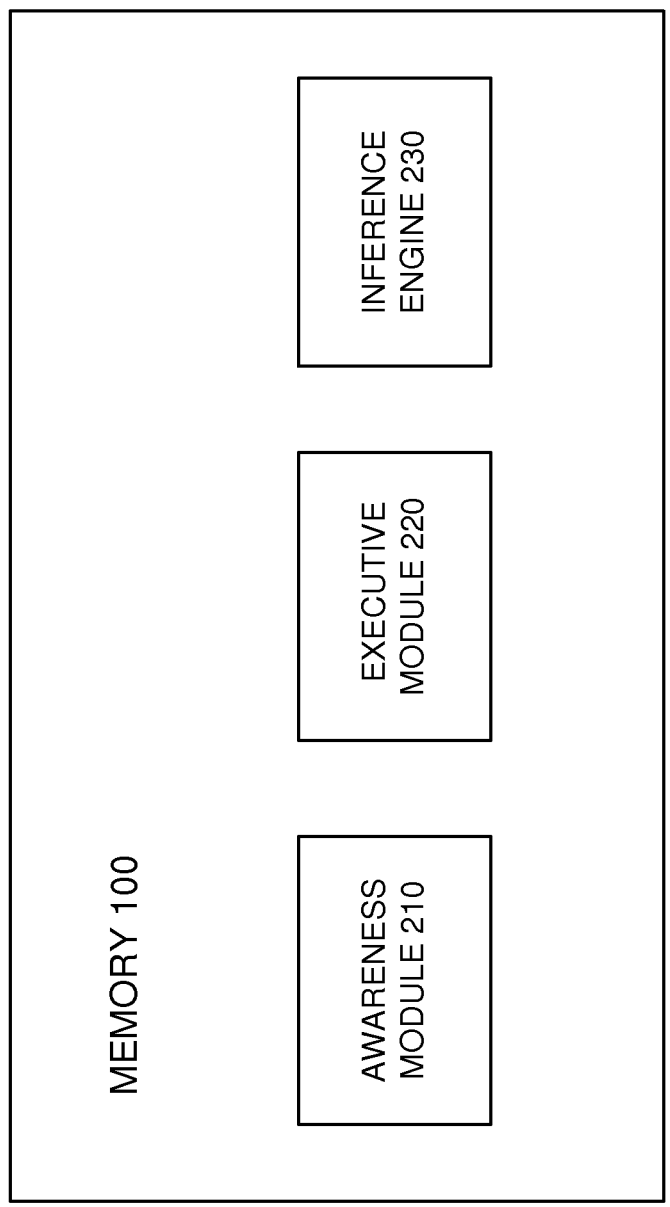
FIG. 2 illustrates a memory having distinct modules according to embodiments of the invention in a system for deriving personal lighting preferences and/or rules.

FIG. 2 illustrates a memory 100 for providing instructions to processor 120 for deriving and modifying personal lighting preferences according to embodiments of the invention. Memory 100 includes an awareness module 210 and an inference engine 230. In other embodiments of the present invention, the awareness module 210 and the inference engine 230 may be located in local memory 130.

Processor 120 can be a component within a larger interactive system 10. Processor 120 may also control luminaires 150 in lighting network 140 by transmitting a control signal indicative of user's personal lighting preferences associated with user identifier. The term "processor" as used herein refers to any circuitry that processes arithmetic and logic instructions, such as a central processing unit of a computer capable of manipulating information. Embodiments of processor 120 include, but are not limited to, conventional microprocessors, application specific integrated circuits (ASICs), and field-programmable gate arrays (FPGAs). Although FIG. 1 illustrates processor 120 as a single processor, it should be understood that the present invention could be implemented as a plurality of processors 120-1, . . . , 120-n functioning cooperatively.

When executed by processor 120, awareness module 210 receives a first signal indicative of a user identifier associated with the user and relates to the identification of personal device 40 from personal device 40. Exemplary embodiments of personal device 40 include a mobile phone, an SMS device, a personal digital assistant, a BLACKBERRY device, a IPHONE device, and a device including a programmable RFID tag. An "RFID tag" as used herein includes any object that can be incorporated into any other object in order that the object incorporating the RFID tag may be tracked using radio waves. In some embodiments, an RFID tag may contain at least two parts: a first part involving an integrated circuit for performing such functions as modulating and demodulating radio frequency signals, and a second part involving an antenna for receiving and transmitting radio-frequency signals. Additionally, an RFID tag may be passive or active. In some embodiments of system 10, personal device 40 may include a processor.

When executed by processor 120, awareness module 210 receives the first signal from personal communication device 40 via communication module 110. Embodiments of communication module 110 may include, for example, a wired network, a wireless network, or a combination of different wired and wireless networks. Moreover, communication module 110 may involve different technologies, e.g., infrared communications, fiber optics communications, or computer networking technologies, for example, Ethernet technologies. Communication module 110 may also include a local area network (LAN) or a wireless local area network (WLAN). For example, communication module 110 may include wireless computer communication technologies between processor 120 and personal device 40.

The term "network" as used herein refers to any interconnection of two or more devices (including lighting controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

When executed by processor 120, awareness module 210 also detects a signal indicative of any adjustments requested by the user via a user interface. The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

Processor 120 is configured to record in the memory 130 any adjustments requested by a user along with a snapshot of the context in which each adjustment was requested. An adjustment may be, for example, the intensity of one or more luminaires, the spectrum of one or more luminaires, the pattern of illumination emitted by one or more luminaires, the color temperature of one or more luminaires, and/or any combination of the foregoing. The context of an adjustment may be, for example, a time of day, an intensity of the natural light, a schema, any settings prior to the request, an amount of the change, a time between a request a preceding change, a position of the user, an activity of the user before and/or after a request, a number of other people present, a temperature, a humidity level, etc. Moreover, Inference Engine 230 is configured to instruct processor 120 to analyze requested adjustments and corresponding contexts, and deduce rules from any identified patterns.

Inference engine 230 is configured to instruct processor 120 to communicate with local memory 130, which stores lighting adjustments requested by the user, and the context in which each of the adjustments was requested. Local memory 130 associates a user identifier with the lighting adjustments made by the user. Embodiments of memory 130 include various types of storage media, e.g., volatile and non-volatile computer memory such as RAM, PROM, EPROM and EEPROM, floppy disks, compact disks, optical disks, hard disks, magnetic tape. In some implementations, the storage media may be encoded with one or more programs capable of being executed on a processor. Various storage media may be transportable, such that the one or more programs stored thereon can be loaded into a processor so as to implement various aspects of the present invention discussed herein. The terms "program" or "computer program" are used herein in a generic sense to refer to any type of computer code (e.g. software or microcode) that can be employed to program one or more processors.

When executed by processor 120, inference engine 230 analyzes the stored user information to identify possible correlations between the adjustments and the context in which the adjustments are made. Inference engine 230 is further configured to instruct processor 120 to create preference rules based on any such correlations. Any preference rules created are transmitted to preferences database 50, which is accessible by other systems, such as interactive systems 20 and 30. Preferences database 50 stores requested adjustments and personal preference rules in association with a user identifier. When executed by processor 120, if inference engine 230 can identify a correlation between adjustments requested by a user and the contexts in which they are requested, a rule based on the correlation is stored for that user in preferences database 50. The requested adjustments may be stored along with the rule in preferences database 50. If a correlation cannot be found, or if the correlation is deemed weak, then the requested adjustments are stored in preferences database 50.

A processor in accordance with the invention in another interactive system, such as interactive systems 20 and 30, may similarly store rules and/or adjustments it derives in preferences database 50. A processor in accordance with the invention in another interactive system may also access rules and/or requested adjustments derived with respect to system 10 through preferences database 50. Moreover, a processor in accordance with the invention may analyze user information in preferences database 50 from a plurality of interactive systems to identify a correlation between adjustments requested by a user and the contexts in which they are requested.

In some embodiments of the invention, memory 100 further includes an executive module 220. Executive module 220 instructs processor 120 to control the individually-controllable luminaires 150 or other devices in controllable lighting network 140 based on the preference rules. Executive module 220 may also receive signals identifying requested adjustments and implement the adjustments to change individually controllable luminaires 150. Processor 120 implements the adjustments based on the personal preferences of a user and based on the priority of the user or personal preferences of the user. In some embodiments, controllable lighting network 140 may be composed of, for example, dedicated hardware communication links. In some other embodiments, luminaires 150 include one or more addressable luminaires which communicate through a lighting network that includes other types of communication links, for example, an Ethernet or a wireless network connection. In other embodiments of the present invention, executive module 220 may be located in local memory 130.

Processor 120 may be a lighting controller, which is used herein generally to describe various apparatus relating to the operation of one or more luminaires. A controller, including a lighting controller, may be implemented in numerous ways (e.g., such as with dedicated hardware) to perform various functions discussed herein. A controller also may be implemented as a combination of dedicated hardware to perform some functions and a processor (e.g., one or more programmed microprocessor and associated circuitry) to perform other functions. Examples of controller components that may be employed in various embodiments of the present disclosure include, but are not limited to, conventional microprocessors, application specific integrated circuits (ASICS), and field-programmable gate arrays (FPGAs).

According to some embodiments of the present invention, processor 120 may receive multiple user identifiers associated with users within interactive system 10. Executive module 220 temporally orders user identifiers based on information received from the personal devices. For example, after communication module 110 receives a signal including a user identifier associated with personal device 40, communication module 110 may subsequently receive another signal including a user identifier associated with a second personal device. Under such circumstances, executive module 220 may associate a higher priority with the user identifier from the first personal device and a lower priority with the user identifier from the second personal device. Accordingly, communication module 110 may transmit a first signal to processor 120. The first signal identifies the priority of the user identifier associated with the first personal device. Moreover, communication module 110 may transmit a second signal to processor 120. The second signal identifies the priority of the user identifier associated with the second personal device. In such embodiments, processor 120 may receive the first and second signals at approximately the same time.

When processor 120 receives both user identifier signals, processor 120 may proceed to adjust luminaires 150 based on the first signal. In this case, the adjustments are not only based on the personal preferences of the first personal device user but also its priority. If the user of the first personal device is associated with a higher priority, the first signal may be scheduled to be considered next. Likewise, processor 120 may proceed to adjust luminaires 150 based on the second signal. Again, the adjustments are not only based on the personal preference of the second personal device user but also its priority. If the user of the second personal device is associated with a lower priority, the second signal may not be scheduled to be considered next. Similarly, processor 120 may prioritize three of more users associated with corresponding personal devices.

Alternatively, user identifiers can be temporarily ordered, or prioritized, based on additional or alternative criteria. For example, user identifiers from certain personal devices may be assigned higher or lower priority. Similarly, user identifiers from personal devices in certain locations may be assigned higher or lower priority. For example, user identifiers from personal devices recognized as associated with regular patrons may be assigned higher priorities as compared to user identifiers from personal devices not so recognized. And user identifiers from personal devices recognized to be located within priority zones may be assigned higher priorities as compared to user identifiers from other regions within the same establishment.

The plurality of individually controllable luminaires 150 controlled by processor 120 include, in some embodiments of system 10, one or more luminaires that are installed in fixed locations, and are capable of communicating with processor 120 via controllable lighting network 140. In some other embodiments, individually controllable luminaires 150 may include one or more addressable luminaires which communicate through a lighting network that may include other types of communication links, for example, an Ethernet or a wireless network connection. Communications between processor 120 and controllable lighting network 140 can include control commands sent from executive module 220 of processor 120 to luminaires 150. These commands may cause one or more of luminaires 150 to, for example, turn on, turn off, decrease or increase intensity, or change the spectral power distribution of their illumination.

The term "luminaire" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

A given luminaire may be configured to generate electromagnetic radiation within the visible spectrum, outside the visible spectrum, or a combination of both. Hence, the terms "light" and "radiation" are used interchangeably herein. Additionally, a luminaire may include as an integral component one or more filters (e.g., color filters), lenses, or other optical components. Also, it should be understood that luminaires may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

A given luminaire may be configured to generate electromagnetic radiation within the visible spectrum, outside the visible spectrum, or a combination of both. Hence, the terms "light" and "radiation" are used interchangeably herein. Additionally, a luminaire may include as an integral component one or more filters (e.g., color filters), lenses, or other optical components. Also, it should be understood that luminaires may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more luminaires. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources). The term "spectral power distribution" is understood to refer to the power per unit area per unit wavelength of an illumination, or the per-wavelength contribution to any radiometric quantity (e.g. radiant energy, radiant flux, radiant intensity, radiance, irradiance, radiant exitance, or radiosity).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the term "different colors" implicitly refers to multiple spectra having different wavelength components and/or bandwidths. It also should be appreciated that the term "color" may be used in connection with both white and non-white light.

According to some embodiments, the illumination proximate to personal device 40 created by luminaires 150 may be visible only through the use of technology comprising polarized spectacles and electronically shuttered spectacles. For example, luminaires 150 may repeatedly generate light pulses, technologies such as electronically shuttered spectacles may be synchronized to block the same slice of each lighting period, and luminaires 150 may be configured to shift one or more light pulses into the time slice that is shuttered or blocked.

According to some other embodiments, the illumination proximate to personal device 40 from luminaires 150 may comprise, for example, a single color light and/or a sequence of lights having different colors.

In yet other embodiments, the illumination proximate to personal device 40 created by luminaires 150 may be encoded with a modulated signal corresponding to the user identifier associated with personal device 40 or another user's personal device. In such an embodiment, personal device 40 may comprise at least one sensor for detecting the modulated signal as well as the ability to capture the modulated signal. In such an embodiment, signal may comprise the modulated signal detected and captured by personal device 40.

In other embodiments of the invention, system 10 may include a schematizer for generating a schema (not shown in FIG. 1). The schematizer may create light schema, either from inputs from a lighting designer or from information captured from system 10. In some other embodiments of the invention, system 10 may have a schematizer interface for transmitting a request for a schema to a remote schematizer, where the request includes information indicative of least one of observed system parameters. The schematizer interface is also for receiving a schema from the remote schematizer. Local memory 130 may store observed system parameters and the schema. In some embodiments of the invention, a sensor interface is used for receiving additional observed system parameters and the processor is further used for modifying the schema to compensate for the additional observed system parameters. Further, a schemata marketplace, which is not shown in FIG. 1 may be connectable to system 10 and may be linked to systems 20 and 30. A processor 120 in accordance with the invention may translate the schema into instructions for controlling output settings of at least one controllable lighting network. In such embodiments of the invention, executive module 220 generates a signal directed to the controllable lighting network based on an applicable schema, any applicable preference rules, and any applicable requested adjustments. Where the schema does not permit the applicable requested adjustments, executive module 220 may not generate a control signal that factors in the requested adjustments. Similarly, where the schema does not permit the adjustments suggested by the applicable preference rules, executive module 220 may not generate a control signal that factors in the applicable preference rules. Alternatively, executive module 220 may override the schema with the applicable preference rules and/or requested adjustments.

Figure 3:
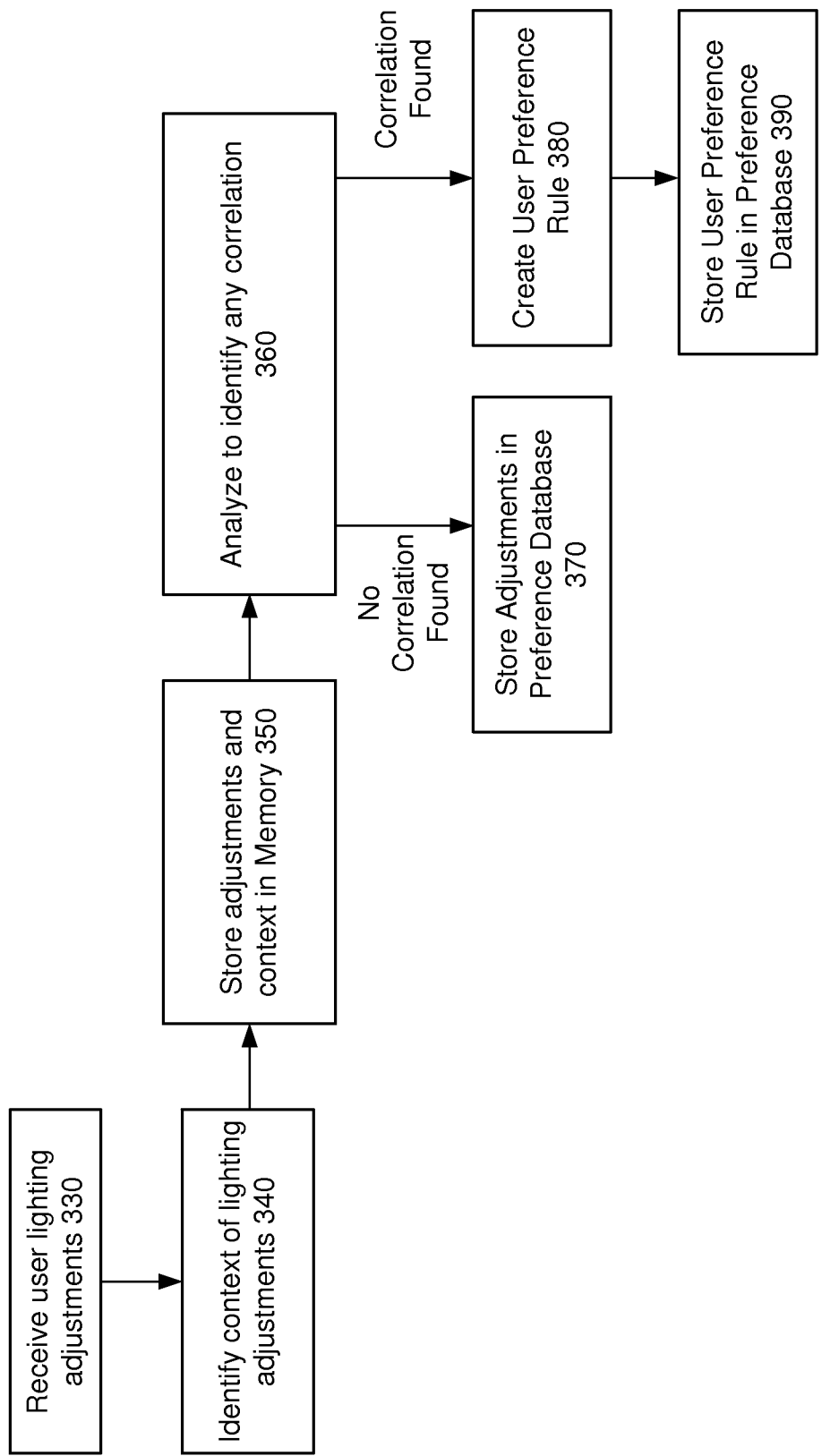
FIG. 3 illustrates a flow diagram of a procedure for deriving personal lighting preferences and/or rules according to an embodiment of the invention.

FIG. 3 illustrates a method for deriving a personal lighting preference rule in light-based system 10 according to an aspect of the invention. In the method of FIG. 3, a user enables personal device 40, or any other identification device such as an RFID tag or other means of identification. For example, the user may have permitted personal communication device 40 to be identified and tracked within interactive system 10, and then brought it into interactive system 10. Once within interactive system 10, the user adjust luminaires 150 in controllable lighting network 140 via a user interface. In step 330, awareness module 210 detects the user identifier and adjustments requested by the associated user and in step 340, awareness module 210 identifies context of lighting adjustments. In optional step 350, awareness module 210 stores the adjustments and the associated contexts in local memory 130. In step 360, inference engine 230 analyzes the adjustments and the associated contexts to identify whether a correlation may be found between the adjustments and the contexts. If a correlation is found, in step 380, inference engine 230 creates a personal preference rule based on the correlation. In step 390, the personal preference rule is stored in preferences database 50 along with the associated user identifier. Alternatively, if a correlation is not found, in step 370, inference engine 230 stores the adjustments in preferences database 50 along with the associated user identifier.

In some embodiments of the invention, awareness module 210 transmits a signal to executive module 220 including information related to adjustments. Depending on the schema running and the adjustments allowed by system 10, executive module 220 in some embodiments of the invention transmits a control signal directing the controllable lighting network 140 to implement the adjustments. In some embodiments of the invention, the user may set a parameter to inform executive module 220 the level of adjustment to implement in response to awareness system 210 detecting user personal preferences. Such parameter may identify how much, how fast, and how often the lighting may change in response to adjustments detected by awareness module 210. In one embodiment, the parameter may also be context sensitive.

According to some embodiment of system 10, a rule may be determined when a user adjusts luminaires 150 in lighting network 140 to a certain setting in identical contexts upon entering system 10. After a predetermined number of occurrences, for example, of the same behavior, the rule can be established and the adjustments used to derive the rule may be deleted. The predetermined number of occurrences may be observed in the same environment, different environments in the same lighting network, or in different lighting networks. If necessary or requested, the user may still make further manual adjustments after the implementation of personal preference rules. System 10 detects these new manual adjustments and may derive additional rules if the adjustments may be linked to a condition such as the time of the day, the location within the office, the task detected or the location of system 10. If no correlation exists, then no rule is created and the adjustments are sent to the preferences database 50. Alternately, if the correlation is weak, luminaires 150 may be gradually adjusted. Inference engine 230 analyses the gradual adjustments to determine whether a correlation between adjustments and the context in which they are made can be identified. If a correlation can be found, a rule is created and stored in preferences database 50 in association with the user identifier. Rules can be stored with a strength indicator, proportional to the number of manual adjustments made or the level of correlation found. Further adjustments may either be stored as another rule, or the old rule may be abolished if weak and a new rule may be created.

Figure 4:
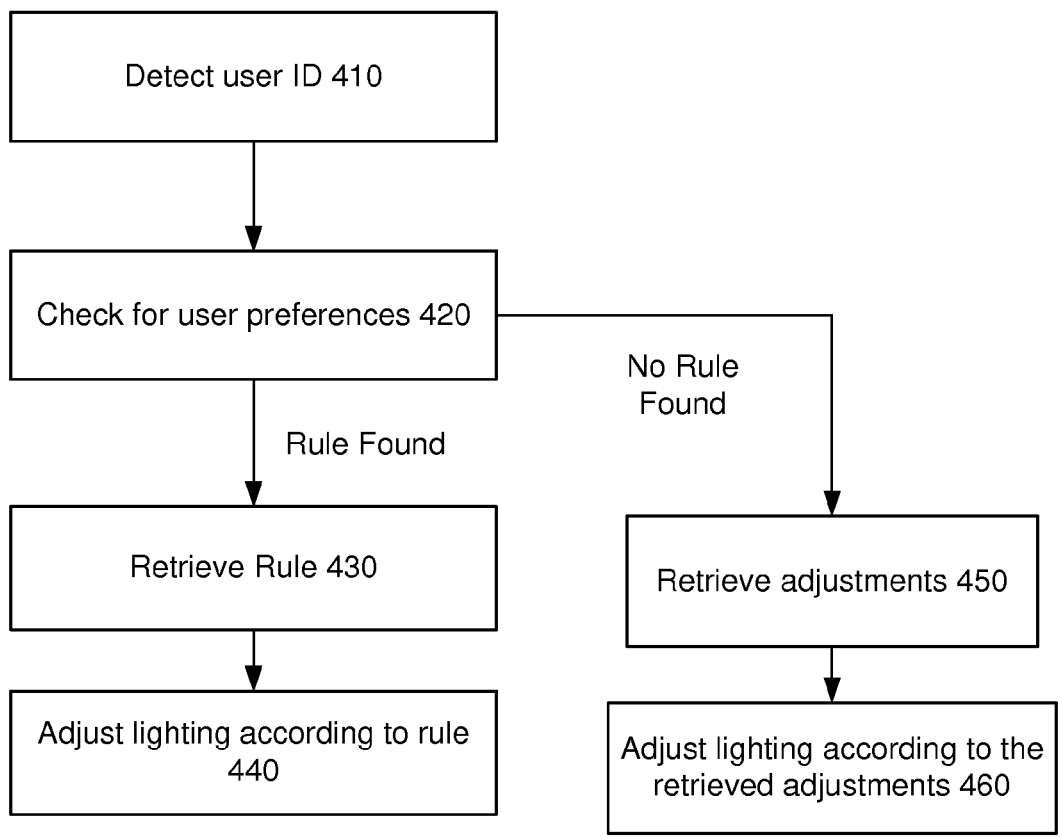
FIG. 4 illustrates a flow diagram of a procedure for applying stored personal preferences and/or rules according to an embodiment of the invention.

FIG. 4 illustrates a method for applying personal preferences in interactive system 10 according to an aspect of the invention. After user enters interactive system 10, in step 410, awareness module 210 detects the user identifier and transmits a corresponding signal to executive module 220. In step 420, executive module 220 checks preferences database 50 for any user preferences associated with the user identifier. If the rule is found, in step 430, executive module 220 retrieves the rule, and adjusts luminaires 150 in controllable lighting network 140 accordingly, in step 440, without the user having to perform a manual adjustment. If no preference rule exists, executive module 220 retrieves any previously stored adjustments from preferences database 50 and stored in local memory 130, in step 450, and, executive module 220 adjusts luminaires 150 according to the retrieved adjustments, in step 460.

Embodiments of the method of FIG. 4 allow further manual adjustments in interactive system 10, if any, to be recorded and analyzed by looping back to step 330 of FIG. 3. The method of FIG. 4 can similarly be used to apply the user's personal preferences in other interactive systems, such as system 20 or 30. Moreover, the user can make manual adjustments in other interactive systems, and have these adjustments recorded in preferences database 50 and analyzed in conjunction with other adjustments to identify correlations. In alternative embodiments, the retrieval of personal preference rules may be done via awareness module 210 rather than directly by executive module 220.

Figure 5:
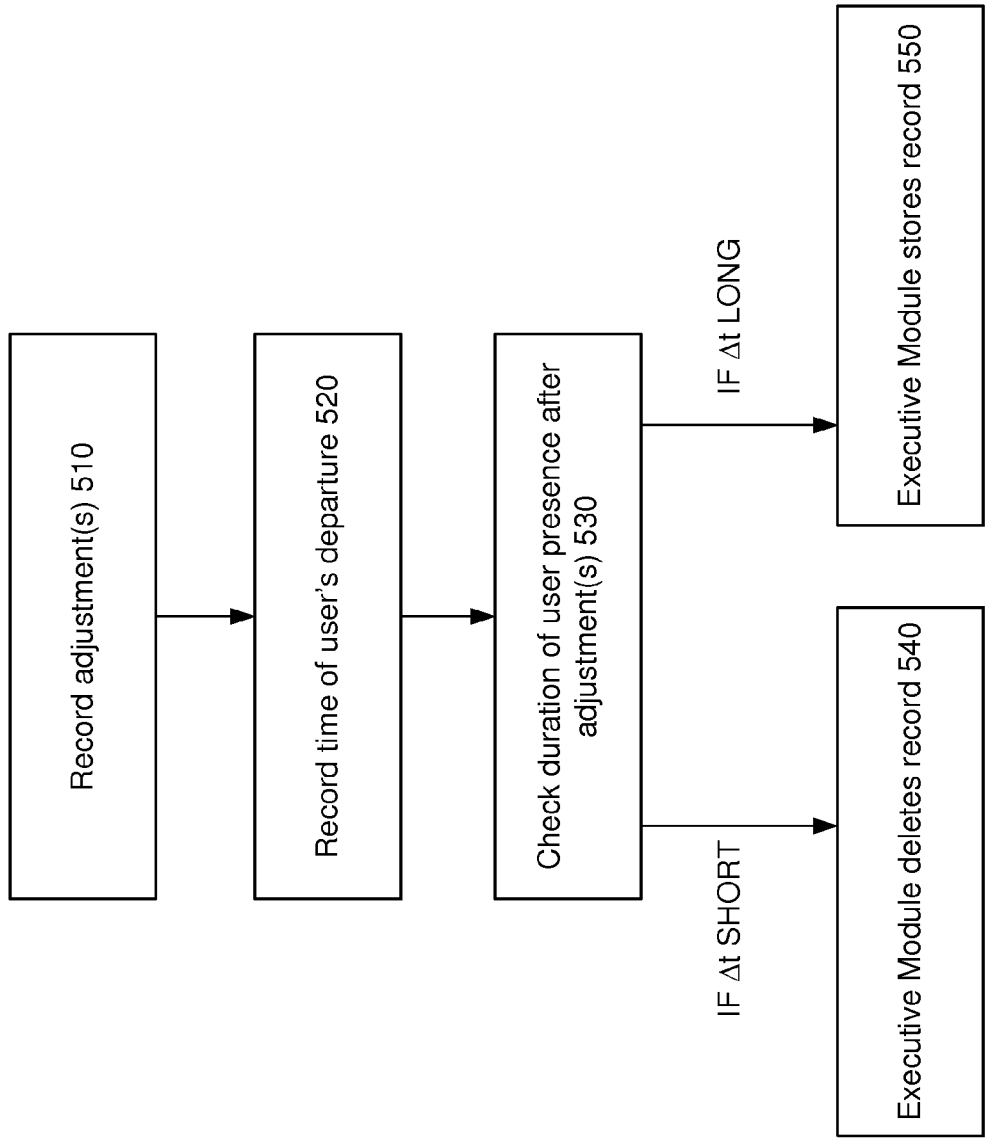
FIG. 5 illustrates a flow diagram of a procedure for distinguishing trivial lighting adjustments from significant lighting adjustments requested by the user according to an embodiment of the invention.

FIG. 5 illustrates a method for distinguishing trivial lighting adjustments from significant lighting adjustments requested by the user consistent with embodiments of the invention. Weighting of adjustments can be directly proportional to the time duration of a user in a system subject to adjustment, or by some other function such as squared, square root, stair function, exponential, logarithmic. The system may be configured to only record changes that are above a certain weighting. For example, changes made in fairly quick succession may indicate that the user is experimenting with system 10. Therefore, changes made in fairly quick succession are considered insignificant adjustments and such adjustments may not be used to derive a rule. If the user leaves the system soon after making an adjustment, the adjustment can be considered trivial or insignificant and can be assigned a low weighting. A change followed by the user staying in the system for an extended period of time can be given a greater weighting.

In step 510 of FIG. 5, awareness module 210 detects a user's manual adjustment(s) and processor 120 records them in memory 130. In step 520, awareness module 210 detects when the user leaves system 10, or the part of system 10 for which the adjustment(s) were made, and processor 120 records time of user's departure. In step 530, in response to the detection of the user leaving, processor 120 checks the duration of the user's presence after the adjustment(s). If the duration is above a certain threshold, in step 540, executive module 220 adds the time duration of the user's presence in system 10, or the part of system 10 for which the adjustment(s) were made, to the record of the adjustment(s) in local memory 130. If the time duration is below the threshold, in step 550, executive module 220 deletes the record.

The minimum weighting necessary for a given change to be taken into account by inference engine 230 may vary depending on the location within system 10. For example, a very low weighting may be appropriate for a foyer or other transient spaces where users walk through frequently. Adjustments made a long time ago may be given less weighting when determining a rule.

If it is found that too high a number of manual adjustments are being made, or changes have been made by the majority of users such that the actual light output is significantly different from the original output envisioned by the lighting designer or creator of the initial schema, executive module 220 and/or inference engine 230 may send records of the manual adjustments, or the number of manual adjustments, and the extent of the adjustments to the schematizer. The schematizer may then reformat the schema accordingly, which can then be run by executive module 220 and/or sent to the schemata marketplace where it can be transmitted to other systems such as system 20 and 30.

In yet other embodiments of the invention, depending on the capability and/or configuration of each system, it may not always be possible to fully implement the personal preference rules in preferences database 50. For instance, Table 1 shows adjustments and a resultant rule for a user in an office space, where the user first sits in an easy chair before moving to his desk. Based on adjustment and context data provided in Table 1, inference engine 230 in accordance with the invention may derive a rule for switching lights to 100% when the user moves from the easy chair to the desk.

TABLE 1

Switch lights to 100% when the user moves from the easy chair to the desk.

| | Adjustment | | | Context | |
|---|---|---|---|---|---|
| Event | Time after entry | Lights adjusted to | Location | Position before adjustment | Position after adjustment |
| 1 | 30 mins | 100% | Office A | Easy chair | Desk |
| 2 | 45 mins | 100% | Office B | Easy chair | Desk |
| 3 | 60 mins | 100% | Office A | Easy chair | Desk |

The user then goes into Office C, which is a system different than Office A or B, and Office C does not include position sensors as part of its awareness system, but may include an entry detector. As a result, the context data that are shown in Table 1 may not be collected, but the existing rule(s) or prior adjustments may still permit the lights to automatically adjust to 100% after an average time of 45 minutes, and/or partial information for such event can be recorded. If the user then goes into Office D, with position sensors, the rule can be enacted accurately. The rules stored in a preferences database can therefore be used in full or partially, depending on the capability of the particular system the user enters.

Table 2 presents another example where the lights in an office may be governed by local context as well as by the preferences of the user. Based on the data provided in Table 2, system 10 may derive a rule for switching lights to 60% when the user moves from the desk to the easy chair, except when other occupants are in the room.

TABLE 2

Switch lights to 60% when the user moves from the desk to the easy chair, except when other occupants have just come into the room.

| | Adjustment | | | Context | | | | |
|---|---|---|---|---|---|---|---|---|
| Event | Time after entry | Lights adjusted to | Location | Lights before | Position before adjustment | Position after adjustment | Room occupancy prior | Room occupancy after |
| 1 | 2 h 30 mins | 60% | Office A | 100% | Desk | Easy chair | 1 | 1 |
| 2 | 3 h 45 mins | 65% | Office B | 100% | Desk | Easy chair | 1 | 1 |
| 3 | 3 h 10 mins | 55% | Office A | 100% | Desk | Easy chair | 1 | 1 |
| 4 | 2 h 22 mins | No change | Office A | 100% | Desk | Easy chair | 1 | 2 |
| 5 | 1 h 15 mins | No change | Office B | 100% | Desk | Easy chair | 1 | 3 |

Table 2 shows that the rule, which is generally to dim the lights when the user of the office moves from the desk to the easy chair, can be invoked depending on the local context. When the user has visitors in the office, resulting in room occupancy of more than one person, the lighting is adjusted to or maintained at the maximum level.

According to some embodiments of the invention, processor 120 may control lighting network 140 in system 10 based on votes received from other users or from personal devices associated with other users.

Figure 6A:
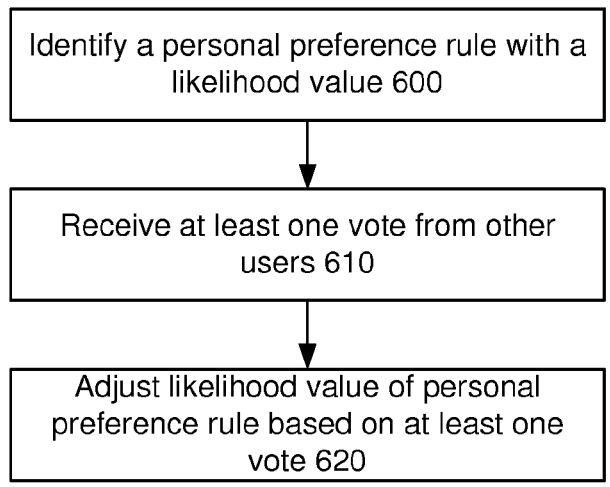
FIG. 6a illustrates a flow diagram of a procedure for modifying a personal preference based on users' votes in response to personal preference rules according to an embodiment of the invention.

FIG. 6a illustrates a method for modifying a personal preference rule of a user based on votes from a plurality of other users consistent with an embodiment of the invention. After a user carrying a means of identification such as personal communication device 40 enters system 10, in step 600, processor 120 identifies a personal preference rule, which has a likelihood value, associated with the user. If the user is the only person in system 10, the user's personal preference rule is not modified, and luminaires 150 may be adjusted according to the user's personal preference rule using the methods explained in FIGS. 3 and 4. If at least one other user is present in system 10, however, the other user(s) preference can be considered before any adjustments are made. In step 610, at least on vote from the other user(s) is received such that adjustments can be made accordingly to a more acceptable rule by the plurality. After receiving any votes from the other users, in step 620, processor 120 adjusts the likelihood value of the user's personal preference rule based on the votes received from the other users.

A user may only be partly willing to have his personal preferences modified or enhanced based on other users' votes. The level of modification may vary based on a threshold value set by the user. The threshold value determines the number of votes needed to modify his preference rule. Moreover, the threshold value may determine the amount by which the preference rule may be modified. When the level of voting reaches the threshold, the personal preference rule is modified and stored as a new rule. If the level of voting does not reach the threshold, the personal preference rule is not modified. Further, the level of adjustment may vary based on the number of other users in system 10. The votes may be entered by users from multiple systems, such as systems 20 and 30, and the votes may be requested by a manager or another user of system 10.

Figure 6B:
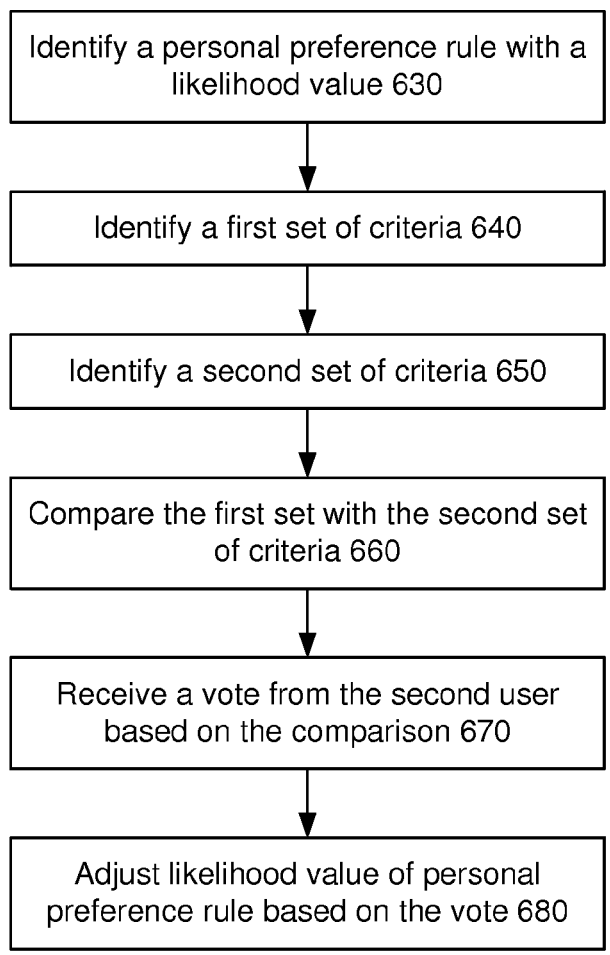
FIG. 6b illustrates a flow diagram of a procedure for modifying a personal preference based on system users' votes in response to a set of criteria according to an embodiment of the invention.

FIG. 6b illustrates another method for modifying a personal preference rule of a user based on votes from a plurality of other users consistent with an embodiment of the invention. A first user carrying a means of identification such personal communication device 40 enters system 10, where a second user resides. In step 630, processor 120 identifies a personal preference rule, which has a likelihood value, associated with the first user. In step 640, processor 120 further identifies a first set of criteria for the first user and in step 650, a second set of criteria for a second user. After identifying both sets of criteria, in step 660, executive module 220 compares the first set of criteria and the second set of criteria. The second user, based on the comparison, votes on the first user's personal preference so that the first user's personal preference may be adjusted to a more acceptable rule by the second user. In step 670, processor 120 receives the vote of the second user and in step 680, adjusts the likelihood value of the first user's personal preference rule based on the vote received from the second user.

In embodiments of the invention, the second user may alternatively base his vote on factors other than the comparison of the first set of criteria of the first user to the second set of criteria of the second user. For instance, the first set of criteria may be significantly different than the second set of criteria, and the comparison of these two sets of criteria may present opposite preferences of each user. In this case, based on the comparison, the second user is likely to vote against the first user's personal preference rule and to lower the likelihood value of the first user's personal preference rule by a certain amount. However, the first and second users may spend a significant amount of time interacting with one another, and may identify other common interests between them. In this case, regardless of how different the first and second sets of criteria are, the second user may not vote against the first user's personal preference rule. Inference engine 230 may ignore the comparison of two sets of criteria when other considerations are available. The second user's vote may not lower the likelihood value of the first user's personal preference rule by as much.

Figure 7:
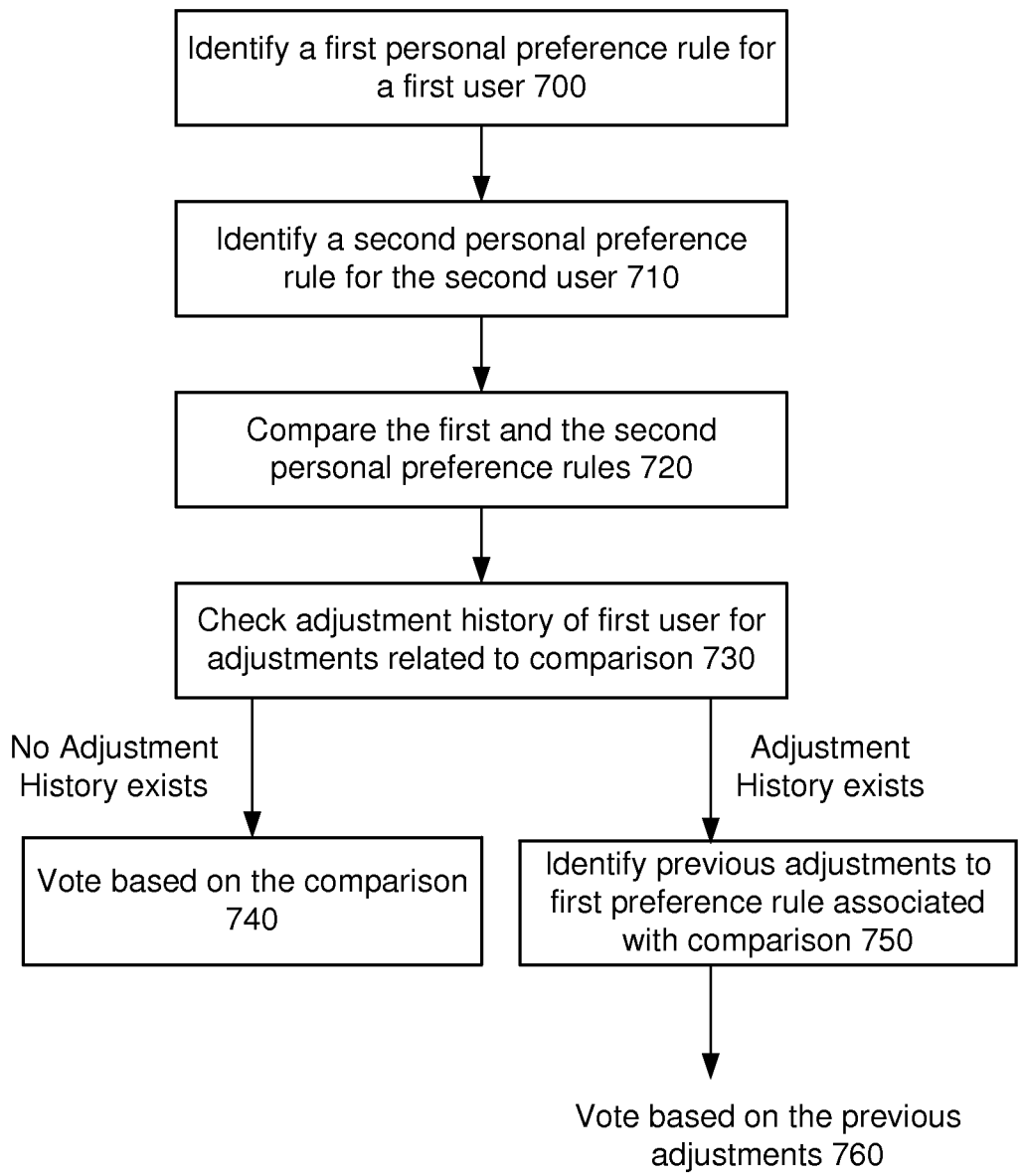
FIG. 7 illustrates a flow diagram of a procedure for, based on a user's history of lighting adjustments, modifying personal preference of another user in response to a comparison of personal preference rules according to an embodiment of the invention.

According to some embodiments of the invention, processor 120 may control luminaires 150 in system 10 based on an adjustment history associated with a user identifier. FIG. 7 illustrates a method for modifying a user's personal preference based on his adjustment history in accordance with an aspect of the invention. After a first user brings personal communication device 40 into system 10, executive module 220 identifies a personal preference rule of the first user in step 700. Since a second user is also present in system 10, in step, 710, executive module 220 also identifies a personal preference rule for the second user. In step 720, processor 120 compares the two personal preference rules. Then, in step 730, executive module 220 checks if the first user has ever voted on any personal preference rules in response to a comparison that is the same as the comparison of the first and second user's personal preference rules. If no adjustment history exists, in step 740, inference engine 230 votes on the personal preference of the second user based on the comparison. If an adjustment history exists, in step 750, executive module 220 identifies previous votes by the first user in the past and in step 760, inference engine 230 votes accordingly based on previous votes. The lighting in system 10 can be controlled based on the comparison and the votes. Upon receiving the vote from the first user, the second user's personal preference rule may be modified by adjusting the likelihood value of the personal preference rule.

Figure 8:
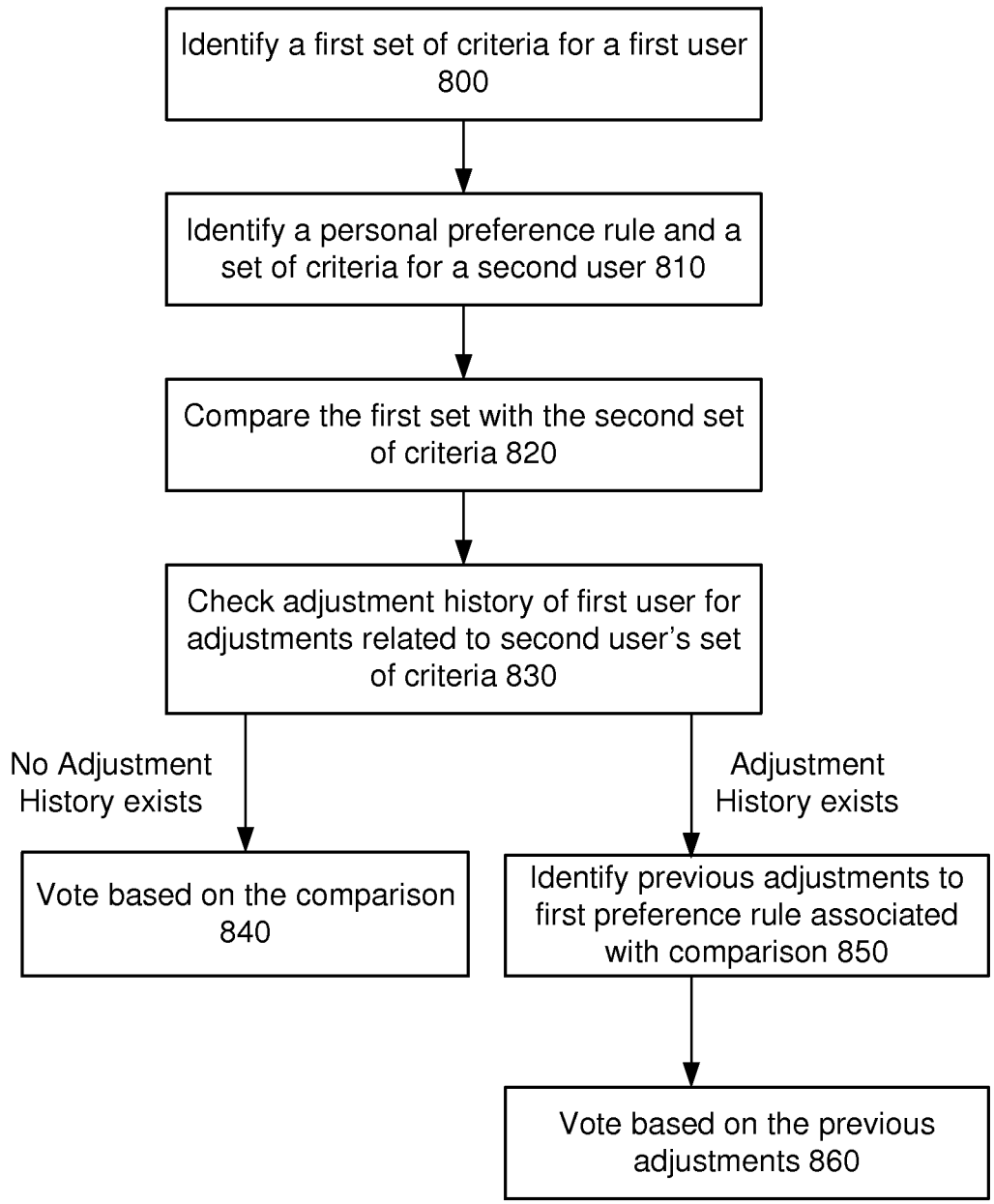
FIG. 8 illustrates a flow diagram of a procedure for, based on a user's history of lighting adjustments, modifying personal preference of another user in response to a comparison of each user's set of criteria according to an embodiment of the invention.

FIG. 8 illustrates another method for modifying a personal preference based on user's lighting adjustment history consistent with an embodiment of the invention. A first user carrying a means of identification such personal device 40 enters system 10, where other users are present. In step 800, executive module 220 identifies a set of criteria for a first user. In step 810, executive module further identifies a personal preference rule and a set of criteria for a second user. After identifying the two sets, in step 820, executive module 120 compares the two sets of criteria. Then, in step 830, executive module 220 examines the first user's adjustments history and checks if the first user has voted in the past against a personal preference rule that is the same as the personal preference rule of the second user based on a set of criteria that is the same as the set of criteria of the second user. For instance, if a first user enters system 10, where a second user whose favorite color is green exists. Executive module 220 examines the first user's adjustments history and checks if the first user has voted against the personal preference rule of a user whose favorite color is green. If no adjustment history exists, in step 840, inference engine 230 votes on the personal preference rule of the second user based on the comparison. If an adjustment history exists, in step 850, executive module 220 identifies how the first user has voted against the personal preference rule of the other users in the past. In step 860, inference engine 230 votes accordingly on the second user's personal preference rule based on previous votes. Upon receiving the vote from the first user, the second user's personal preference rule may be modified by adjusting the likelihood value of his personal preference rule.

In another embodiment of the invention, executive module 220 may retrieve information related to interests of all the users in system 10. Inference engine 230 may then determine the common interests between all the users, such as music. In addition to using such information to modify personal preferences in lighting, such information may be used for other considerations. For instance, such information may be provided to the manager of system 10 for future planning, as a way of increasing the number of repeat users and/or user satisfaction.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, any reference numerals or other characters, appearing between parentheses in the claims, are provided merely for convenience and are not intended to limit the claims in any way, In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for deriving personal preferences related to multiple controllable lighting networks, the system comprising:
    at least one processor configured to execute an awareness module and an inference engine, wherein the awareness module detects: an identifier of a user, a plurality of lighting adjustments to the multiple controllable lighting networks requested by the user and not in response to a system-initiated change, an environmental context corresponding to each of the plurality of lighting adjustments, and a duration of a presence of the user after at least one lighting adjustment, and
    wherein the inference engine analyzes the detected plurality of lighting adjustments and the corresponding environmental contexts to identify a correlation between the detected plurality of lighting adjustments requested by the user and the corresponding environmental contexts, and automatically creates and transmits at least one personal preference rule associated with the detected identifier of the associated user based on the identified correlation to a preferences database which is accessible by another processor in the multiple controllable lighting networks; and
    a memory configured to store the detected plurality of lighting adjustments requested by the user and the corresponding environmental contexts, and the identifier of the associated user,
    wherein if the duration of the presence of the user is below a threshold, the processor is further configured to exclude the at least one lighting adjustment requested by the user.

2. The system of claim 1, wherein the processor is further configured to execute an executive module that automatically generates a control signal directed to the multiple controllable lighting networks to implement the detected plurality of lighting adjustments requested by the user to the multiple controllable lighting networks.

3. The system of claim 1, wherein the processor is further configured to execute an executive module that automatically generates a control signal directed to the multiple controllable lighting networks to implement the detected plurality of adjustments requested by the user to the at least one controllable lighting network based on the at least one personal preference rule and a priority of the user or the at least one personal preference rule.

4. The system of claim 1, wherein the preferences database is configured to store the at least one personal preference rule, the plurality of lighting adjustments requested by the user, and the identifier of the associated user.

5. The system of claim 4, wherein the processor is further configured to request the at least one personal preference rule from the preferences database when the awareness module subsequently detects the identifier of the user.

6. A system for applying personal preferences related to multiple controllable lighting networks, the system comprising:
    at least one processor configured to execute an awareness module and an executive module,
    wherein the awareness module detects: an identifier of a user, a plurality of lighting adjustments to multiple controllable lighting networks requested by the user and not in response to a system-initiated change, corresponding user contexts, and a duration of a presence of the user after at least one lighting adjustment, and
    wherein the executive module requests from a preferences database a personal preference rule associated with the identifier of the user, and based on a correlation between the plurality of lighting adjustments including the at least one lighting adjustment if the duration of the presence of the user is above a threshold requested by the user to multiple controllable lighting networks and the corresponding user contexts, and automatically generates a control signal for implementing the plurality of lighting adjustments requested by the user to the multiple controllable lighting networks based on the personal preference rule applied to the corresponding user contexts,
    wherein the preferences database is accessible by another processor in the multiple controllable lighting networks.

7. The system of claim 6, wherein the plurality of lighting adjustments were requested by the user with respect to a first controllable lighting network and the control signal is directed to a second controllable lighting network.

8. The system of claim 6, wherein the plurality of lighting adjustments were requested by the user with respect to a first controllable lighting network and a second controllable lighting network and the control signal is directed to a third controllable lighting network.

9. The system of claim 6, wherein the executive module further requests a plurality of lighting adjustments associated with the identifier of the user from the preferences database and generates a control signal directed to the at least one controllable lighting network based on the plurality of lighting adjustments associated with the identifier, and wherein the preferences database is further configured to store the plurality of lighting adjustments in association with the user identifier.

10. The system of claim 6, wherein the awareness module further detects at least one lighting adjustment to multiple controllable lighting networks requested by the user and the corresponding user contexts, the system further comprising:
    a memory configured to store the at least one lighting adjustment requested by the user and the corresponding user contexts, and the identifier of the associated user.

11. The system of claim 6, wherein the personal preference rule includes a likelihood value, wherein the likelihood value comprises a probability of the personal preference rule being applied.

12. A system for modifying personal preferences related to multiple controllable lighting networks, the system comprising:
    a preferences database configured to store a plurality of personal preference rules and a plurality of sets of data related to the multiple controllable lighting networks,
    a first personal preference rule being associated with a first user identifier, created automatically based on a correlation between a plurality of lighting adjustments to the multiple controllable lighting networks requested by a first user and not in response to a system-initiated change, corresponding environmental contexts, and a duration of a presence of the first user after a first lighting adjustment of the plurality of lighting adjustments where the duration is above a first threshold, and having a first likelihood value, the first likelihood value comprising a probability of the first personal preference rule being applied, the plurality of lighting adjustments to the multiple controllable lighting networks requested by the first user and corresponding contexts comprising a first set of data; and
    a second personal preference rule being associated with a second user identifier, created automatically based on a correlation between a plurality of lighting adjustments to the multiple controllable lighting networks requested by a second user and not in response to a system-initiated change, corresponding environmental contexts, and a duration of a presence of the second user after a second lighting adjustment of the plurality of lighting adjustments where the duration is above a second threshold, and having a second likelihood value, the second likelihood value comprising a probability of the second personal preference rule being applied, the plurality of lighting adjustments to the multiple controllable lighting networks requested by the second user and corresponding environmental contexts comprising a second set of data;
    at least one processor configured to retrieve the first personal preference rule and the first set of data from the preferences database, to retrieve the second set of data from the preferences database, to compare the first set of data with the second set of data, and to adjust the first likelihood value of the first personal preference rule based on the comparison; and
    at least one further processor configured to access the first personal preference rule.

13. The system of claim 12, wherein the first set of data further comprises at least one vote indicating a lighting preference of the first user, and the second set of data further comprises at least one vote indicating a lighting preference of the second user.

14. The system of claim 13, wherein the executive module further generates a control signal directed to solicit the at least one vote indicating a lighting preference from each of the first user and the second user.

15. A method for deriving personal preferences related to a plurality of controllable lighting networks comprising at least one memory for storing data and instructions, a user interface, a lighting source, at least one processor configured to execute the instructions from distinct software modules, the distinct software modules comprising an awareness module, an executive module, and an inference engine, the distinct software modules located in the at least one memory and, when executing the instructions, to perform computer-implemented steps of:

detecting by the awareness module a user identifier and a plurality of lighting adjustments to at least one controllable lighting network requested by a user and not in response to a system-initiated change;

identifying by the awareness module an environmental context for each of the plurality of lighting adjustments;

detecting by the awareness module whether a duration of a presence of the user after at least one lighting adjustment is below a threshold;

excluding by the executive module the at least one lighting adjustment if the duration is below the threshold;

analyzing by the inference engine the plurality of lighting adjustments requested by the user and the contexts for the plurality of adjustments to identify a correlation between the plurality of lighting adjustments requested by the user and the contexts;

creating automatically by the inference engine at least one personal preference rule based on the identified correlation; and storing the at least one personal preference rule in a preferences database with the user identifier, the at least one personal preference rule being associated with the user identifier;

wherein the at least one personal preference rule is accessible by at least one further processor in the plurality of controllable lighting networks.

16. The method of claim 15, further comprising:

subsequently detecting by the awareness module presence of the user identifier;

transmitting by the awareness module to the executive module a signal indicating the presence of the user identifier; and automatically implementing by the executive module adjustments in the controllable lighting networks in response to the signal based on the at least one personal preference rule associated with the user identifier.

17. The method of claim 15, further comprising directing the at least one memory to store the adjustments and the contexts for the plurality of adjustments by the executive module.

18. The method of claim 15, wherein the contexts for the plurality of adjustments comprise at least one of identification of a schema, settings prior to change by the adjustments, amount of the change, time, position, activity of the user, temperature, and humidity.

19. A method for modifying a personal preference in a plurality of controllable lighting networks comprising at least one memory for storing data and instructions, a user interface, a lighting source, at least one processor configured to execute the instructions from distinct software modules, the distinct software modules comprising an awareness module, an executive module, and an inference engine, the distinct software modules located in the at least one memory and, when executing the instructions, to perform computer-implemented steps of:

identifying a personal preference rule and a first set of criteria for a first user, the personal preference rule having a likelihood value, the likelihood value comprising a probability of the personal preference rule being applied, and created automatically based on a correlation between a plurality of lighting adjustments to the controllable lighting network requested by the user and not in response to a system-initiated change, contexts for the plurality of adjustments, and a duration of a presence of the first user after at least one lighting adjustment of the plurality of lighting adjustments where the duration is above a threshold;

identifying a second set of criteria for at least one second user;

comparing the first set of criteria with the second set of criteria;

adjusting the likelihood value of the personal preference rule based on the comparison; and storing the personal preference rule in a preferences database with the user identifier, the preferences database accessible by at least one further processor in the plurality of controllable lighting networks.

20. The method of claim 19, further comprising receiving at least one vote for the personal preference rule of the first user based on the comparison with the at least one second user.

21. The method of claim 20, further comprising adjusting the likelihood value of the personal preference rule based on the at least one vote.

22. The method of claim 20, wherein the personal preference rule with the adjusted likelihood value is stored in the preferences database.

\* \* \* \* \*